Figure 1:
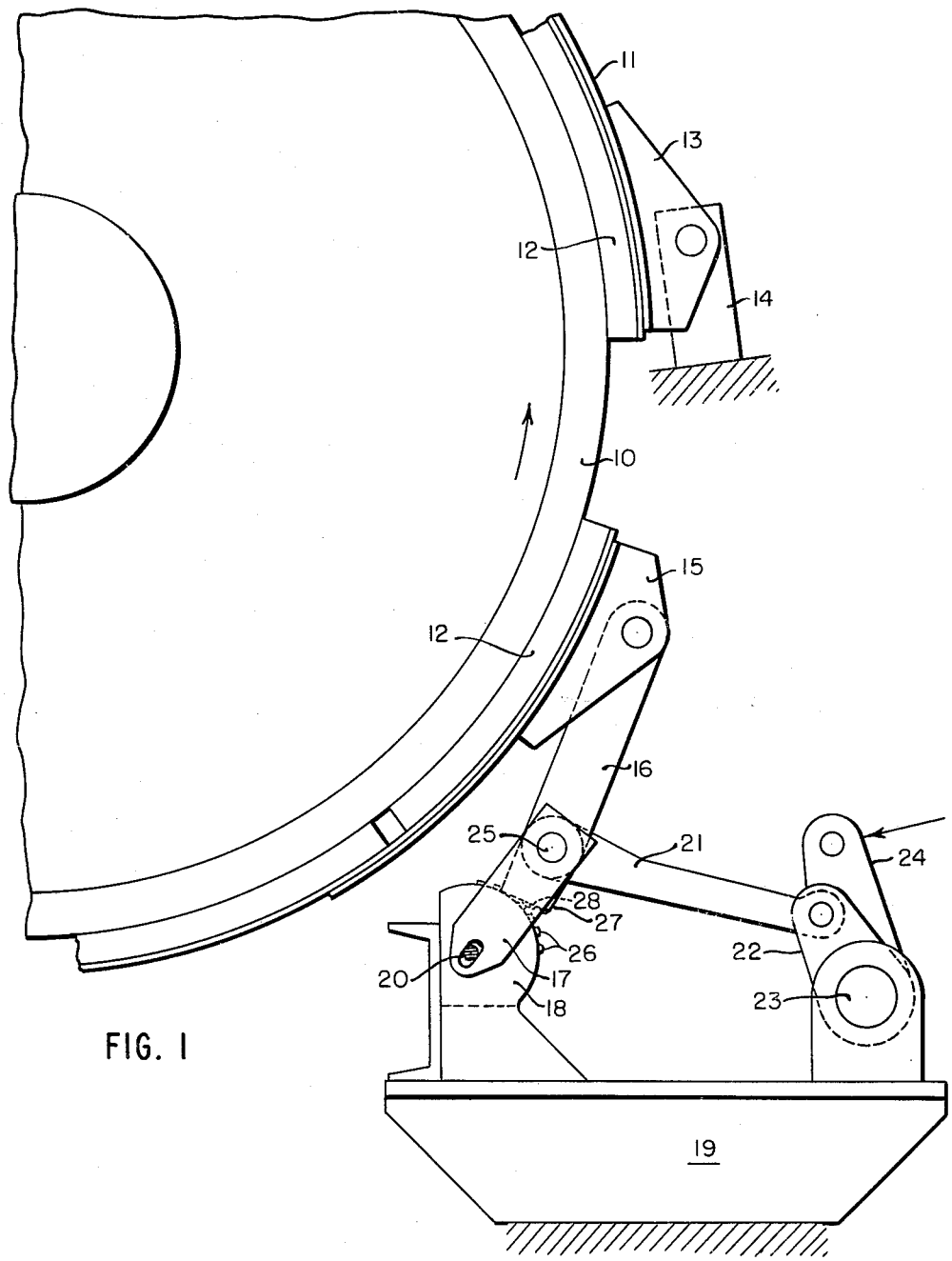

INVENTORS
ROBERT E. McCANN
ELBERT WALKER
JOHN R. REEVE, JR.
ATTORNEYS

Oct. 26, 1965 R. E. McCANN ETAL 3,213,707
TOGGLE MECHANISM FOR BRAKE BAND
Filed Jan. 23, 1963 2 Sheets-Sheet 2

INVENTORS
ROBERT E. McCANN
ELBERT WALKER
JOHN R. REEVE, JR.
BY
ATTORNEYS 3,213,707
TOGGLE MECHANISM FOR BRAKE BAND
Robert E. McCann, Elbert Walker, and John R. Reeve, Jr., Pampa, Tex., assignors to Cabot Corporation, Boston, Mass., a corporation of Delaware
Filed Jan. 23, 1963, Ser. No. 253,347
5 Claims. (Cl. 74—520)

This invention comprises a new and improved mechanism for modifying the action of toggle links as they are straightened in assuming their intended load. Although of general application the invention is herein disclosed in association with brake bands where its use is attended with particular advantage.

A desirable action of brake band application linkage is to provide rapid displacement of the band through the initial rotation of the brake shaft to bring the brake band into initial contact with the brake rim to provide a rapid initial movement and a slower movement at high mechanical advantage in the later phase of the wrapping force. When a wire line system is used to hoist and lower a load the usual means of manipulating the line is by winding or unwinding on a drum. For heavy duty systems the drum is provided at one or both ends with a cylindrical brake rim which is encircled by a band that is applied to dissipate energy when lowering a load and released when the drum is rotated by a motor or engine for hoisting a load. The band operates on a cylindrical brake rim and is of the self-energizing type in that it is wrapped around the brake band 270 to 350° and held against movement in the direction of the brake rim. The self-energizing effect is obtained by anchoring one end of the band and applying a wrapping force essentially tangent to the surface of the brake rim and in the direction of braking rotation at the other end of the band. The present invention consists in improved mechanism for applying the wrapping force to a brake band which results in certain advantages in construction and operation as will appear hereinafter.

One important advantage is that our improved construction compensates for any expansion of the brake rim that may be caused by the frictional contact of the brake band under uninterrupted conditions of operation. It will be recognized that all the braking energy is dissipated in heat at the brake rim and band. This heat builds up in the brake rim and causes the rim to expand. As the brake rim expands the band becomes more tightly wrapped thereon with the result that for a "brake-on" condition the dimension of the rim is greater for a hot brake than it is for a cold brake. The mechanism of this invention is designed to overcome the loss of mechanical advantage between a hot brake and a cold brake and this is accomplished by automatic adjustment of toggle mechanism connected to the brake band.

Figure 2:
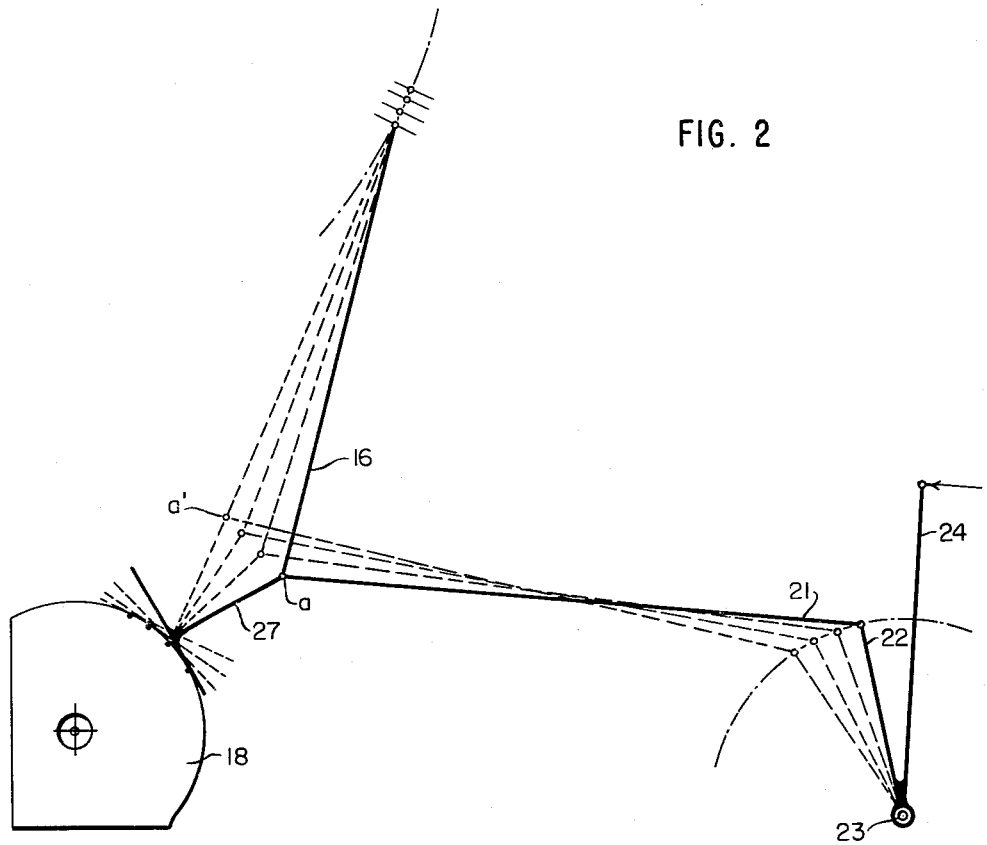
Figure 3:
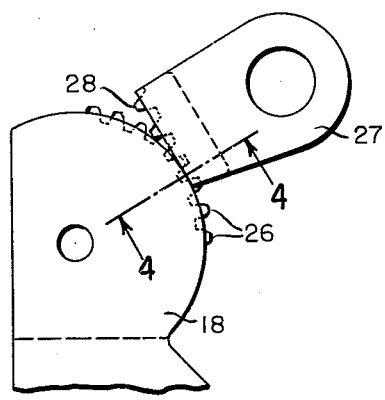
Figure 4:
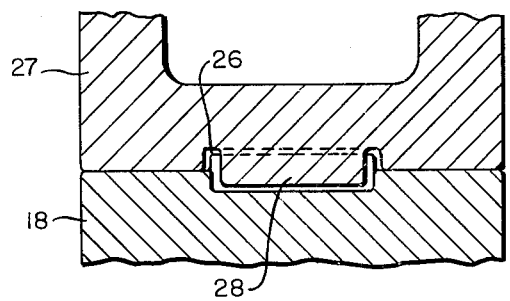

These and other features of the invention will be best understood and appreciated from the following description of a preferred embodiment thereof selected for purposes of illustration and shown in the accompanying drawings in which:

FIG. 1 is a view in elevation showing portions of a brake drum to which the improved toggle mechanism is applied, FIG. 2 is a diagrammatic view indicating different positions of the mechanism, FIG. 3 is a fragmentary view in elevation, and FIG. 4 is a fragmentary sectional view on the line 4—4 of FIG. 3 and on an enlarged scale.

In FIG. 1 is shown a portion of a brake drum having a rim 10 and arranged to rotate counterclockwise in lowering a load upon the brake drum. Cooperating with the brake rim 10 is a brake band 11 carrying a number of brake shoes 12. One end of the brake band 11 is anchored by means of a yoke 13 to a stationary stud 14 which projects from the frame of the machine. The other and movable end of the brake band is connected through a yoke 15 to the upper end of a toggle link 16. The lower link 17 of the toggle has a pin and slot connection to a stationary bracket 18 which projects from the bed 19 of the hoist. Connection of the lower toggle link 17 to the bracket 18 is made by a transverse pin 20 which permits lost motion of the link 17 when the toggle pin 25 and link are lifted.

The toggle 16–17 is broken and straightened to release or apply tension to the brake band by a link 21 connected to a crank arm 22 fast to a toggle shaft 23 herein shown as mounted in bearings in a bracket projecting upwardly from the bed 19. The shaft 23 is arranged to be oscillated by an arm 24 which is arranged to be rocked in a counterclockwise direction in straightening the toggle.

The toggle links 16 and 17 are connected by a toggle pin 25 upon which is pivotally mounted a supporting block 27 having gear teeth 28 formed in a central zone of its lower surface as shown in FIGS. 3 and 4. The bracket 18 is formed as a circular segment having teeth 26 which mesh with the gear teeth 28 of the block 27. The teeth 26 like those of the block are formed in a central zone located between smooth circular surfaces. These supply a rolling bearing for the smooth surfaces of the block 27 at both sides of the teeth 28.

The broken condition of the toggle links is indicated in FIG. 2 in full lines, the position of the toggle pin 25 being indicated by reference character $a$. In this broken condition of the toggle the block 27 occupies the position shown in FIG. 3 with its lowermost teeth 28 in mesh with the teeth 26 of the segmental bracket. As the toggle link is straightened by force applied to the arm 24 the toggle pin 25 moves pivotally to the position indicated by $a'$ in FIG. 2 and consequently the block 27 climbs up upon the segmental bracket 18 to the position shown in FIG. 1 thereby bodily lifting the toggle through the toggle pin 25 and so increasing the wrapping of the brake band 11 upon the rim 10.

Conversely, when the arm 24 is moved in a clockwise direction to break the toggle, the block 27 will be forced to swing by rack-and-pinion action toward its lower initial position and the brake band will be released with accelerated movement. In the movement of the block 27 the operating pressure of the toggle links is entirely sustained by the smooth surfaces of the block and segment at either side of their meshing teeth 26–28.

It will be understood that the drum may be provided at both ends with brake rims and bands and that toggle shaft 23 may extend across the drum and connected to operate the bands of both rims simultaneously.

It should be recognized that the smooth cam surfaces are highly desirable to prolong the wear life of the mechanism but that the manipulation of the toggle system can be achieved successfully without the use of these smooth surfaces.

Having thus disclosed our invention and described in detail an illustrative embodiment thereof, we claim as new and desire to secure by Letters Patent:

1. Mechanism for applying tension to the band of a band brake, comprising a toggle having one end connected to the brake band and the other supported for movement for lost motion, together with a stationary toothed segment connected to the toggle joint by means operative to advance the toggle joint when the toggle is being straightened.

2. Mechanism for modifying the action of toggle links in being straightened, comprising a block pivotally connected to the toggle joint and having gear teeth, and a stationary segment having teeth meshing with the gear teeth of said block.

3. Mechanism for modifying the action of toggle links as defined in claim 2, further characterized in that the stationary segment has spaced rolling surfaces at opposite sides of its teeth.

4. Mechanism for modifying the action of toggle links as defined in claim 2, further characterized in that both the stationary segment and the pivoted block have contacting rolling surfaces disposed at both sides of their meshing teeth.

5. Mechanism for applying tension to the band of a band brake, comprising toggle links having a common toggle pin, one link being connected to the free end of the brake band and the other having a lost-motion connection with a stationary toothed segment, and a toothed block directly connected to the toggle pin and meshing with said segment, whereby the toggle pin is advanced and retracted as the toggle links are straightened and broken.

References Cited by the Examiner

UNITED STATES PATENTS

| | | | |
|---|---|---|---|
| 120,527 | 10/71 | Napier | 74—520 |
| 550,277 | 11/95 | Lambert | 74—520 |
| 1,518,527 | 12/24 | Ledbetter | 74—520 X |
| 2,047,061 | 7/36 | Edwards | 74—519 |
| 2,151,893 | 3/39 | Brauer | 188—77 |
| 2,315,781 | 4/43 | Gerow | 74—422 |

BROUGHTON G. DURHAM, *Primary Examiner.*